United States Patent
Braun et al.

(10) Patent No.: US 10,304,016 B2
(45) Date of Patent: May 28, 2019

(54) SYSTEMS AND METHOD FOR LONE WORKER MONITORING

(71) Applicant: AssetWorks LLC, Wayne, PA (US)

(72) Inventors: Bradley Kenneth Braun, Calgary (CA); Maninder S. Gill, Calgary (CA)

(73) Assignee: AssetWorks LLC, Wayne, PA (US)

( * ) Notice: Subject to any disclaimer, the term of this patent is extended or adjusted under 35 U.S.C. 154(b) by 258 days.

(21) Appl. No.: 15/207,936

(22) Filed: Jul. 12, 2016

(65) Prior Publication Data

US 2018/0018608 A1    Jan. 18, 2018

(51) Int. Cl.
    *G06Q 10/06* (2012.01)
    *G07C 5/00* (2006.01)
    *G07C 5/08* (2006.01)
    *G06Q 40/00* (2012.01)

(52) U.S. Cl.
    CPC ... *G06Q 10/063114* (2013.01); *G06Q 40/125* (2013.12); *G07C 5/008* (2013.01); *G07C 5/0841* (2013.01)

(58) Field of Classification Search
    CPC ......... G06Q 10/063114; G06Q 40/125; G07C 5/008; G07C 5/0841
    USPC ...................................... 701/29, 36
    See application file for complete search history.

(56) References Cited

U.S. PATENT DOCUMENTS

| | | | |
|---|---|---|---|
| 2017/0083844 A1* | 3/2017 | Baker | H04W 4/70 |
| 2017/0132929 A1* | 5/2017 | Mays | G08G 1/161 |
| 2017/0217261 A1* | 8/2017 | Mays | B60C 23/0479 |

* cited by examiner

Primary Examiner — Muhammad Shafi
(74) Attorney, Agent, or Firm — Warner Norcross + Judd LLP (57) ABSTRACT

There are systems and methods for monitoring a vehicle in a fleet of vehicles and a worker that is driving the vehicle, the system comprising a headless check-in switch and a headless check-in indicator; a headless vehicle monitoring device, mounted in the vehicle, comprising: a communication module configured to communicate with a worker monitoring server; a processor, executing computer-readable instructions stored on a non-transitory medium, configured to: obtain a start monitoring signal from the headless check-in switch to launch a monitoring session; communicate the start monitoring signal to the worker monitoring server; prompt, via the headless check-in indicator, a worker to check-in; receive, via the headless check-in switch, a check-in signal; send the check-in signal to the worker monitoring server; and confirm, via the headless check-in indicator, a check-in status received from the worker monitoring server.

20 Claims, 5 Drawing Sheets

SYSTEMS AND METHOD FOR LONE WORKER MONITORING

TECHNICAL FIELD

The invention relates generally to vehicle monitoring devices. More specifically it relates to a system and method for a monitoring a solitary worker using a vehicle mounted device.

BACKGROUND

At any given time, an owner of a fleet of vehicles may employ several workers who travel alone in vehicles. There are risks and potential dangers that arise when a worker is alone, and it is desirable to have solitary workers check-in with a supervisor, at periodic intervals, to confirm their safety.

Currently there check-in systems that have a display interface that allows a worker to check into a back end system and provides the worker with a confirmation that he or she has checked in. These systems can be expensive. Other low cost check in systems without displays allow the ability for worker to check in but do not provide end to end communication—i.e. the worker receives no confirmation that he or she has successfully checked in.

As such, improvements to address such problems are desirable.

SUMMARY OF THE INVENTION

There is disclosed a system for monitoring a vehicle in a fleet of vehicles and a worker that is driving the vehicle, the system may comprise: a headless vehicle monitoring device, mounted in the vehicle, comprising: a headless check-in switch and a headless check-in indicator; a communication module configured to communicate with a worker monitoring server; a processor, executing computer-readable instructions stored on a non-transitory medium, configured to: obtain a start monitoring signal from the headless check-in switch to launch a monitoring session; communicate the start monitoring signal to the worker monitoring server; prompt, via the headless check-in indicator, a worker to check-in; receive, via the headless check-in switch, a check-in signal; send the check-in signal to the worker monitoring server; and confirm, via the headless check-in indicator, a check-in status received from the worker monitoring server.

The system of may further comprise a headless login device and a headless login status indicator and wherein the processor, may be further configured to: receive, via the headless login device, a login signal; provide the login signal to the worker monitoring server; indicate, via the headless login status indicator, a login status received from the worker monitoring server.

The system may further comprise a vehicle OBDII interface, configured to communicate with a vehicle OBDII computer and wherein the processor may be further configured to: accumulate performance data from a vehicle OBDII interface; and send the performance data to the worker monitoring server for performance monitoring.

The performance data may further comprise driver performance data when the login status indicates the worker is logged in.

The communication module may be configured to communicate with a geo-location service and the performance data further comprises geo-location data.

The performance data may further comprise an ignition status and the processor may be further configured to request, via the headless login status indicator, a login signal based on the ignition status.

The processor may be further configured to log off the worker, and terminate the monitoring session, based on the ignition status.

The indicating may further comprise an audible tone when the login status is unsuccessful.

The receiving may further comprise the headless login device scanning an identification device.

The headless monitoring switch may comprise one or more light emitting diodes that can be lit, unlit or flashing, indicating the check-in status and the headless login status indicator comprises one or more light emitting diodes that can be lit, unlit or flashing, indicating the login status.

There is further disclosed a method for monitoring a vehicle in a fleet of vehicles and a worker that is driving the vehicle, the method may comprise: obtaining, by a headless vehicle monitoring device, mounted in the vehicle, a start monitoring signal from the headless check-in switch to launch a monitoring session; communicating the start monitoring signal to a worker monitoring server; prompting, via a headless check-in indicator, a worker to check-in; receiving, via a headless check-in switch, a check-in signal; sending the check-in signal to the worker monitoring server; and confirming, via the headless check-in indicator, a check-in status received from the worker monitoring server.

The method may further comprise: receiving, via a headless login device, a login signal; providing the login signal to the worker monitoring server; indicating, via a headless login status indicator, a login status received from the worker monitoring server.

The method may further comprise: accumulating performance data of the vehicle from a vehicle OBDII interface configured to communicate with a vehicle OBDII; and sending the performance data to the worker monitoring server for performance monitoring.

The performance data may further comprise driver performance data when the login status indicates the worker is logged in.

The performance data may further comprise geo-location data from a geo-location service.

The performance data may further comprise an ignition status, the method further comprising requesting, via the headless login status indicator, a login signal based on the ignition status.

The method may further comprise logging off the worker, and terminating the monitoring session, based on the ignition status.

The indicating may comprise an audible tone when the login status is unsuccessful.

The receiving may further comprise the headless login device scanning an identification device.

The headless monitoring switch may comprise one or more light emitting diodes that can be lit, unlit or flashing, indicating the check-in status and the headless login status indicator comprises one or more light emitting diodes that can be lit, unlit or flashing, indicating the login status.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
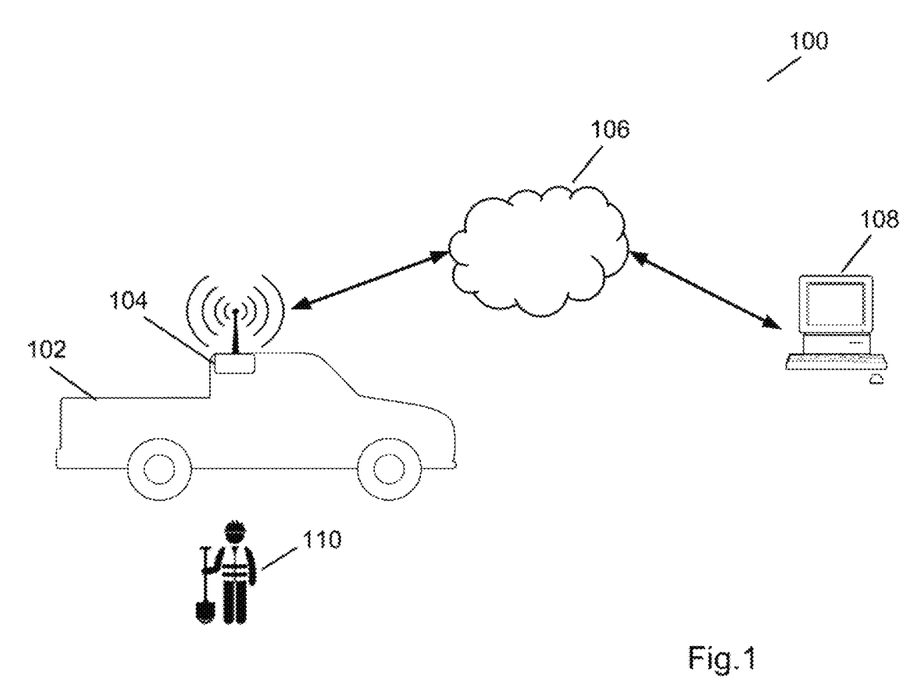
FIG. 1 is a diagram of the lone worker check-in system according to a non-limiting embodiment of the present invention.

FIG. 1 is a diagram of the lone worker check-in system 100, comprising: vehicle 102, worker check-in device 104, communication network 106, worker monitoring server 108, and worker 110.

System 100 utilizes the I/O on a low cost vehicle monitor device to allow a worker to login to a host system, initiate a lone worker monitoring session, receive confirmation of back-end system monitoring and receive localized reminders for periodic check-in (failure to check-in leads to notification of specified personnel). Monitoring is initiated via a timed button press and feedback is provided via simple LEDs.

A lone worker monitoring session may be a time where a solitary or lone worker 110 wishes to be monitored by a supervisor by checking in at periodic intervals to ensure the worker's safety. For example, a lone worker in a dangerous situation may initiate the lone worker monitoring session, requiring the worker to check in every 5 minutes, if 5 minutes elapse without a check-in, a supervisor is alerted and can attempt to contact the worker via other means, or alert a third party such as emergency services.

Initiating a lone worker monitoring session ("Active Monitoring Session") may cause a series of flashes and/or solid colored LEDs to illuminate according to a predefined pattern, that may indicate the check-in status to the worker, such a confirmation that the worker is checked-in, that the worker is currently being monitored, that the worker needs to check in because a certain time has elapsed since the last check-in, etc. For example a solid colored LED may indicated that the worker is logged in and being monitored and flashing LEDs may indicate a check-in is required, as will be described herein.

Vehicle 102 may be a car, truck, van, bus, etc. which may be part of a fleet of vehicles and may provide or relate to the provision of fleet services (which may vary depending on what the fleet is for). Vehicle 102 may have many systems running thereon, as known in the art, such as engines, brakes, on-board monitoring systems, etc. (each a "vehicle system" not shown).

Worker check-in device 104 may be an electronic tracking device capable of being mounted on vehicle 102 and capable of communicating with worker monitoring server 108 via communication network 106. Worker check-in device 104 may have numerous hardware and software elements, described herein, and may be capable of reporting the position of vehicle 102 and may send other signals and data to worker monitoring server 108. Worker check-in device 104 may be capable of interacting with other vehicle systems to detect various vehicle parameters, for example engine data, ignition status, vehicle speed, etc.

In one embodiment, worker check-in device 104 may be a modified version of an existing "headless" device, as is known in the art, such as the Assetworks™ ME200 fleet tracking unit or may be a modified version of any one of the following Assetworks™ asset tracking units: ME50. As used herein a "headless device" is a device that lacks a graphical/visual user interface. The Assetworks™ ME200 detects hard braking and employs both an on-board alert engine to monitor and respond to conditions regarding a vehicle's external environment, and a highly configurable and over-the-air device management and maintenance system. Worker check-in device 104 may have substantially similar internal components to the ME200 (processors, circuit boards, memory, etc.) and may have additional inputs and outputs, as described herein.

In another embodiment, worker check-in device 104 may be a mobile user device such as a smart phone, tablet, or similar device, though such devices would not generally be considered headless and may not perform varied functionality such as may be performed by the ME200.

Communication network 106 may enable communication between different elements of system 100. Communication network 106 may be substantially any public or private network, wired or wireless, and may be substantially comprised of one or more networks that may be able to facilitate communication between themselves.

Worker monitoring server 108 may include one or more computers or servers and which may include a number of physical and logical components (not shown), including a central processing unit ("CPU"), random access memory ("RAM"), an input/output ("I/O") interface, a network interface, non-volatile storage, and a local bus enabling the CPU to communicate with the other components. The CPU executes an operating system and computer-executable instructions for implementing a lone worker monitoring and check-in software platform as will be described. RAM provides relatively-responsive volatile storage to the CPU. The I/O interface allows for input to be received from one or more devices, such as a keyboard, a mouse, etc., and outputs information to output devices, such as a display and/or speakers. The network interface enables communication with other systems. Non-volatile storage stores the operating system, the computer-executable instructions for implementing the lone worker monitoring and check-in software platform and data stored and used by the lone worker monitoring and check-in software platform. During operation of the monitoring server 108, the operating system, the computer-executable instructions for implementing the lone worker monitoring and check-in software platform and the data may be retrieved from the non-volatile storage and placed in RAM to facilitate execution and access. Worker check-in device 104 may include substantially similar computer components (CPU, RAM, I/O, BUS) as worker monitoring server 108.

Worker monitoring server 108 may include automated software functionality or may be operated by one or more users or administrators. Worker monitoring server 108 may include a Field Service Solution software platform (FSS). Exemplary FSS may be AssetWorks™ Field Service Solutions™. The Field Service Solution offering from Asset-Works LLC combines in-vehicle Electronic Logging Devices (ELDs) and in-office software to make legislative compliance effortless. It may meet the requirements of the ELD mandate while providing additional functionality such as driver behavior, field ticketing/dispatch, GPS/telematics, vehicle inspection and work alone safety options. Worker monitoring server 108 and FSS may be used interchangeably herein. The FSS may include a database of workers 110 which may be used to determine whether a valid lone worker can initiate a login or an Active Monitoring Session as described herein. The FSS may at a client site and/or be on a hosted server that may be accessed by clients via a web browser to review the status of their monitored workers, configure notifications (missed check-ins, service interruptions) and review worker locations.

Several messages or signals may be sent between worker check-in device 104 and the FSS 108. Worker check-in device 104 may send the following data to the FSS:

Login signals, which may indicate to the FSS that a worker has requested a login or wishes to logoff: LOGIN REQUEST, LOGOFF Monitoring signals, which may request that a monitoring session be initiated or terminated, for example MONITOR REQUEST, MONITOR OFF Check-in signals, which may be a signal to report a check in, for example CHECKIN REQUEST Worker check-in device 104 may receive the following signals/messages from the FSS 108:

Login messages, which may indicate whether a worker login was successful, for example "Login Fail", "Logged In"

Monitoring messages, which may indicate that a monitoring session has successfully started or has failed to start because the worker has not logged in, for example "Monitor Fail—No Driver", "Monitor Active"

Check-in confirmation messages which may confirm that a check in was successfully processed or received by the FSS, for example "Checked In"

Worker check-in device 104 may also use one or more internal signals and parameters (internal to vehicle 102, which may mean they were created by other systems of vehicle 102, not shown, and collected by worker check-in device 104) to manage worker monitoring, including:

Vehicle Ignition Status, which may track whether the ignition is currently running;

Accelerometer or motion status (such as via GPS), which may indicate whether the vehicle is in motion;

Equipment in use status, which may indicate whether any equipment is being used by the lone worker to perform tasks, such as may have been assigned, via FSS 108, to worker check-in device 104;

IGNITION OFF TIMER, which may begin timing when the ignition has been switched off;

IGNITION ON TIMER, which may begin timing when the ignition has been turned on;

CHECKIN TIMER, which may a timer to track how long it has been since the worker last checked in;

Active Monitor Session, which may be a flag to indicate that a current monitoring session is active.

Figure 2:
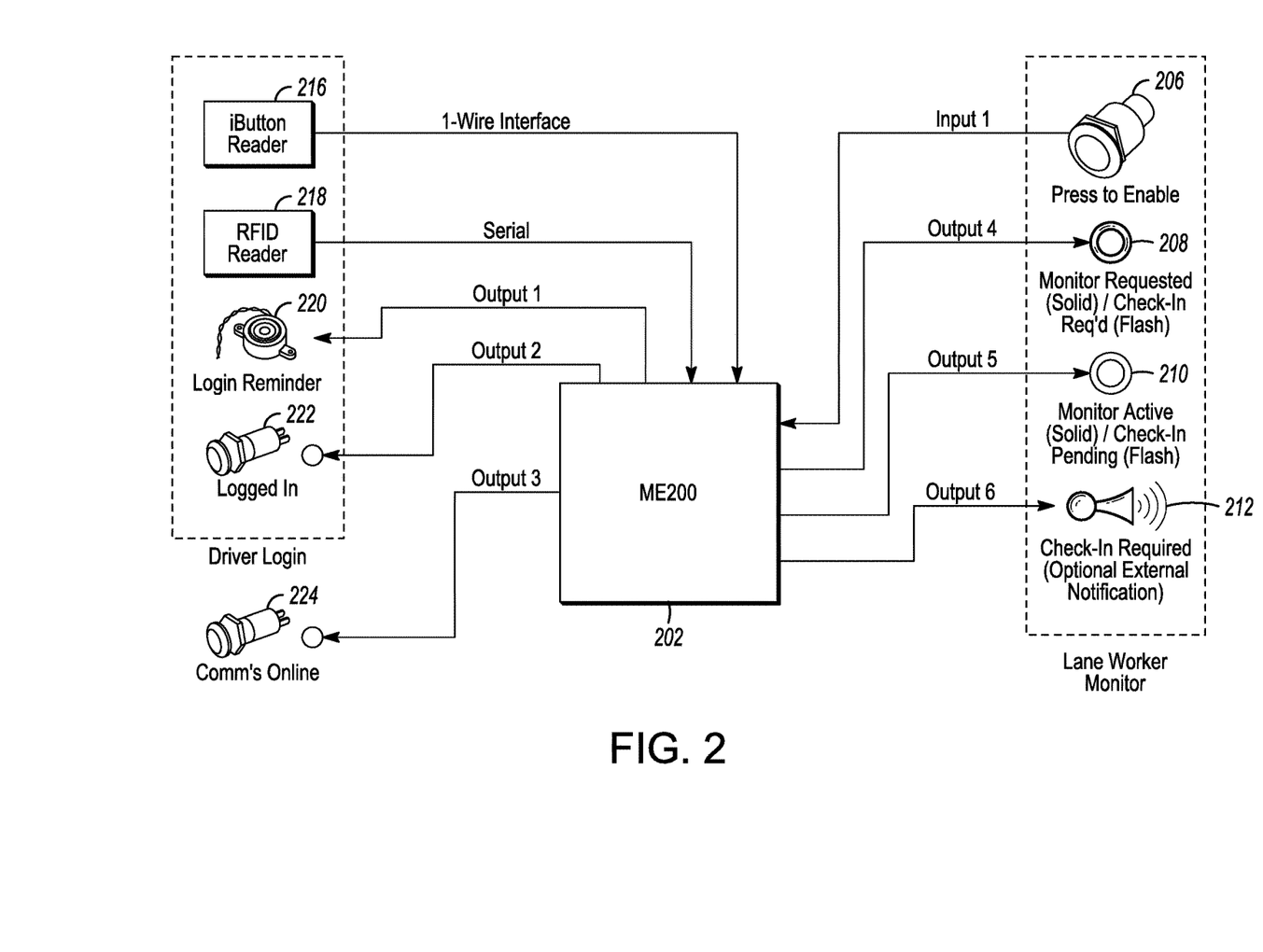
FIG. 2 shows a schematic diagram of the lone worker check-in device according to a non-limiting embodiment of the present invention.

FIG. 2 is a diagram of the worker check-in device 104 comprising: base unit 202, switch 206, monitor requested LED 208, monitor active LED 210, speaker 212, iButton reader 216, RFID reader 218, buzzer 220, logged-in LED 222 and comms LED 224. In a preferred embodiment, worker check-in device 104 may comprise either the iButton reader 216 or the RFID reader 218, but not both. Base unit 202 may be substantially similar to an Assetworks™ ME200 fleet tracking unit.

Base unit 202 may contain a number of physical and logical components (not shown), including a central processing unit ("CPU"), random access memory ("RAM"), an input/output ("I/O") interface, a network interface, non-volatile storage, and a local bus enabling the CPU to communicate with the other components, described herein. Base unit 202 may respond to and control the functionality of the elements described herein.

Worker check-in device 104 may monitor a worker in an Active Monitoring Session and alert a worker to the status of the monitoring, such as via one or more visual, tactile, and/or auditory signals, such as via the monitor requested LED 208, monitor active LED 210, and speaker 212. These LEDs may light up and or flash accordingly to provide visual feedback to a worker that there is a current Active Monitoring Session, for example by a solid color illumination, or that a check-in is required, for example via a flashing, or that a worker check-in has been received by the FSS, for example by a solid illumination in a second color. A worker may check-in by pressing switch 206.

Switch 206 may be a switch capable of being pressed by a worker to initiate or terminate an Active Monitoring Session, and to check-in during an Active Monitoring Session. In the preferred embodiment, switch 206 may be a DigiKey Switch PV6H240SS-3R1 or a switch with similar functionality. In one embodiment, monitor requested LED 208 and monitor active LED 210 may be incorporated into switch 206, (i.e. one piece of hardware) where switch 202 may display two or more colors, where a first color may represent monitor requested LED 208 and a second color may represent monitor active LED 210. In another embodiment, switch 206, monitor requested LED 208, and monitor active LED 210 may be three separate pieces of hardware.

Monitor requested LED 208 may be a light emitting diode (LED), capable of illuminating or flashing in one more colors. Monitor active LED 210 may be substantially similar to monitor requested LED 208, but may be a different color. Monitor requested LED 208 and monitor active LED 210 may alert a worker that a monitoring session has been requested or initiated or that some action is required (or not required) by the worker, for example alerting the worker to check-in by pressing switch 202.

In the preferred embodiment, monitor requested LED 208 and monitor active LED 210 may be one single LED incorporated into switch 206. Both monitor requested LED 208 and monitor active LED 210 may have one or more states corresponding to the current illumination of the LED, for example ON: illuminated;
OFF: not illuminated;
FLASH: alternating between illuminated and not illuminated at a regular interval, for example 1 second illuminated, 1 second not illuminated, 1 second illuminated, and so on;
PULSE: alternating between illuminated and not illuminated at an irregular interval, for example 1 second illuminated, 9 seconds not illuminated, 1 second illuminated, and so on.

Speaker 212 may be any type of commonly known loudspeaker or similar device capable of converting an electrical signal into a corresponding auditory signal/sound, including audible instructions. Speaker 212 may be used to notify a worker that a check-in has been requested or a check-in is required, through one or more noises, ringtones, beeps, tones, chimes, etc. or audible instructions, for example "Check-in Required".

A worker may initiate an Active Monitoring Session any time he or she desires to be monitored. In order to initiate an Active Monitoring Session, a worker must first login. If a worker attempts to initiate an Active Monitoring Session without having first logged in, the worker check-in device 104 may alert a worker to login via an auditory signal from buzzer 220, described herein. Worker check-in device 104 may also prompt a worker to log in depending on vehicle 102 ignition status. If a worker attempts a login during an Active Monitoring Session the worker may hear an error tone emitted from buzzer 220. During the login procedure, logged-in LED 222 may illuminate to provide feedback to the worker of his or her current login status, and let the worker know a login is being attempting, and when a login has been successful.

iButton reader 216 may be a device capable of reading a device using 1-Wire® technology developed by Maxim Integrated™. In one embodiment, iButton reader 216 may be a Maxim Integrated™ CZ-2 iButton Probe. iButton reader 216 may have an integral LED that provides a functionally relevant indication that the iButton needs to be touched here for a login.

RFID reader 218 may be a device capable of reading an RFID tag, as is known in the art.

Either of i) a worker scanning an RFID tag on RFID reader 218 or ii) scanning an iButton device on iButton reader 214, may be referred to herein as an "ID Scan".

Buzzer 220 may be a device that emits a buzz and/or plays one or more noises, beeps, tones, chimes, or other audible alarms to alert a worker to login to the system by an ID Scan. In on embodiment, buzzer 220 may be an 85 dB Piezo Buzzer, or a device with similar specifications, for example 4-28 VDC, carrying 5 mA current at 12V, with a loud buzzer tone rating of 3,600 Hz. Buzzer 220 may play one or more dedicated tones that alert a worker to login or that an error has occurred, for example, buzzer 220 may play a "Login Reminder Tone" and an "Error Tone".

Logged-in LED 222 may be a light emitting diode (LED) that may indicate whether the worker is logged in to the system. Logged-in LED 222 may have one or more states similar to the monitor requested LED 208. Typically the LED may be illuminated when the worker is logged in and dark when the worker is not logged in.

Comms LED 224 may be substantially similar to logged-in LED 222, and may represent the status of whether the communication system is online—i.e. that worker check-in device 104 is currently in the communication range of communication network 106 and/or worker monitoring server 108. Typically comms LED 224 may be illuminated when the communication system is online and not illuminated when the communication system is offline.

Because vehicle 102 may travel virtually anywhere, it may sometimes be out of range of communication network 106, for example in a tunnel, or not proximate to any communication tower (not shown). At other times, there may be interruptions to either communication network 106 and/or working monitoring server 108 that may disrupt communication.

Method of Monitoring a Lone Worker

Figure 3:
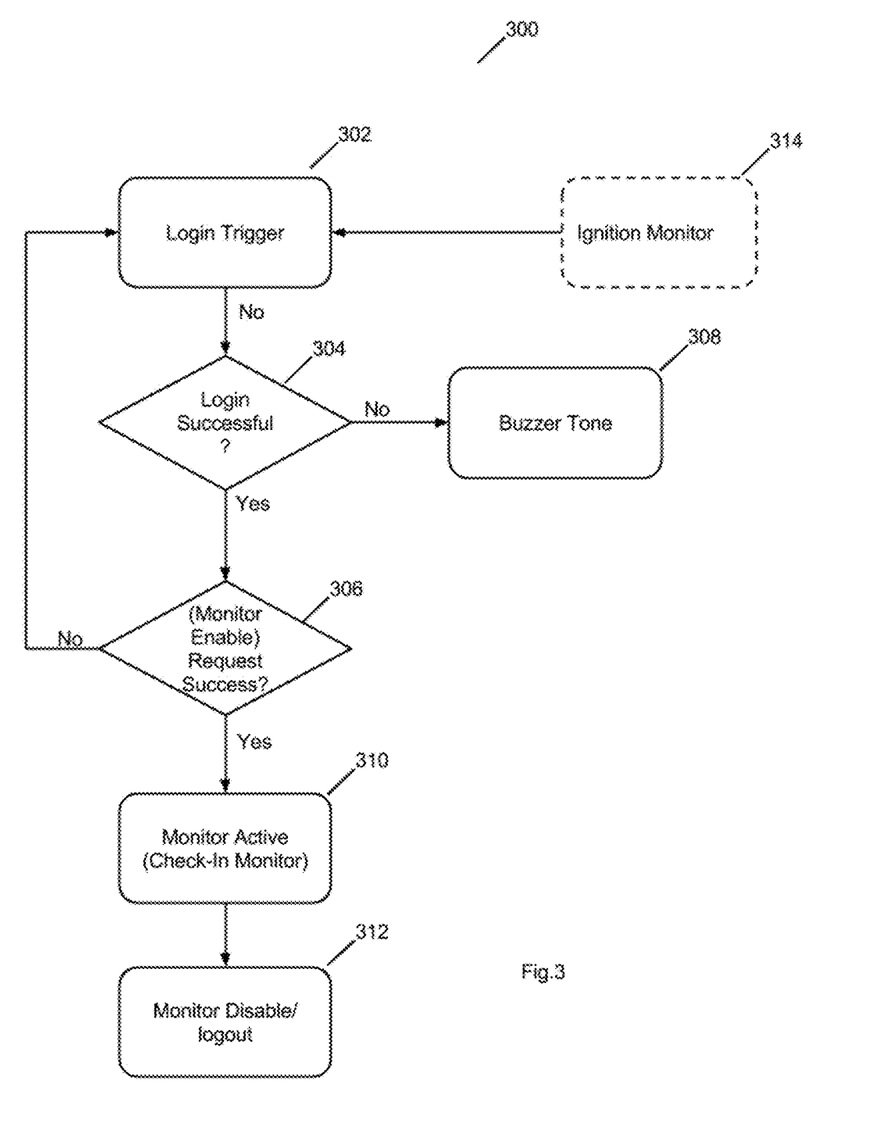
FIG. 3 is a flowchart of a method for check-in based monitoring a lone worker according to a non-limiting embodiment of the present invention.

FIG. 3 is a flowchart of a method 300 for check-in based monitoring a lone worker.

Method 300 begins at 302 where the worker check-in device receives a login trigger. A login trigger may be received when a worker performs an ID Scan, or when a worker attempts to initiate an Active Monitoring Session when not logged in, (as described herein at step 306), or may be prompted automatically based on the ignition status of vehicle 102, as described herein. If the trigger is received because of an attempted initiated Active Monitoring Session or based on ignition status, then buzzer 222 may emit a Login Reminder Tone, and the worker check-in device 104 may wait for a worker to perform an ID Scan. Once an ID Scan is performed, method 300 proceeds to 304 to request a login.

If the worker attempts to login via an ID Scan at 302 during an Active Monitoring Session, then buzzer 220 may emit an Error Tone. (i.e. worker is already being monitored and has thus already logged in)

At 304, when the worker initiates an ID Scan, logged-in LED 222 may be turned off if it was on; logged-in LED 222 may start flashing (indicating login attempt in progress); and a LOGIN REQUEST signal may be sent to the FSS on the worker monitoring server 108 and worker check-in device 104 may wait to receive either a "Logged In" message or "Login Fail" message from the FSS.

The LOGIN REQUEST signal may tell the FSS that worker has requested a login on a particular worker check-in device 104. FSS may then either confirm the login and send a "Logged In" message to worker check-in device 104, or may reject the login and send a "Login Fail" message. FSS confirmation/rejection may be performed automatically by various software functionality, (for example by verifying the login device is still active), or may require approval/rejection from an administrator. The login may be rejected for example if the device used for the login is invalid, or if the worker is not authorized for any reason, or if there is a communication problem or computer processing error.

If worker check-in device 104 receives a "Logged In" message from the FSS, then worker check-in device 104 may turn on logged-in LED 222, indicating to the worker that he or she has successfully logged in, and method 300 may proceed to 306.

If the "Login Fail" message is received from the FSS, then method 300 proceeds to 308, where logged-in LED 222 may be turned off, indicating to the worker that the login was not successful, and worker check-in device 104 may command buzzer 222 to emit a Login Reminder Tone indicating to the worker to attempt another login, and method 300 may end. A worker may attempt another login at any time.

Ignition Monitor and Login

One way a login trigger may be initiated is via an ignition monitor (such as shown at 314 in FIG. 3). Worker check-in device 104 may also initiate a login trigger based on the ignition status of vehicle 102. A login trigger may be initiated after the ignition has been turned on and there is currently no Active Monitor Session. Such login trigger may first check the IGNITION OFF TIMER to see how much time has elapsed since the ignition was last off (so if the ignition was recently turned off then a login trigger would not necessarily be triggered by the ignition monitor or if the ignition was turned on after a lengthy period of being off, that would cause a login trigger).

Worker check-in device 104 may acquire vehicle 102 ignition status from a vehicle system. Worker check-in device may have one or more internal timers, e.g. IGNITION ON TIMER, IGNITION OFF TIMER, which may start running once worker-check-in device 104 detects the ignition status changes, for example once ignition is turned on IGNITION ON TIMER starts, and IGNITION OFF TIMER is set to zero or "cleared".

If the ignition is on, and if the ignition is transitioning from off and there is no Active Monitoring Session, and a predefined time has elapsed, for example 1 hour, since the ignition transitioned from off to on, then a login sequence may be initiated at 302. In some instances, the ignition of vehicle 102 may be turned on and off numerous times during a work day. If the ignition is on, but was previously on a relatively short time ago, a login may not need to be initiated because the worker may still be logged in. If the ignition has not been on for a long period time, for example a predefined time of one hour, then the worker may be prompted to log in.

If the ignition is off or the ignition is not transitioning from off, or there is an Active Monitoring Session, then no login sequence is initiated, but the ignition timers may continue to run accordingly.

Worker check-in device 104 may also automatically log a worker off. If the ignition has been off for a predefined time, for example one hour, and there is no Active Monitoring Session, then a LOGOFF signal may be sent to the worker monitoring server 108 and queued in the FSS, logged-in LED 222 may be turned off, IGNITION OFF TIMER may be cleared. Worker monitoring device 104 may then automatically log the work out.

Initiating an Active Monitoring Session

At 306, after a successful login, a worker may initiate an Active Monitoring Session by pressing and holding switch 206 for a predefined time, for example three seconds. The monitor requested LED 208 may be turned on, a MONITOR REQUEST message may be sent to worker monitoring server 108 and queued in the FSS. Worker check-in device 104 may then wait to receive either a "Monitor Active" message or a "Monitor Fail—No Driver" message from the FSS on the worker monitoring server 108.

The FSS may approve the request for monitoring by sending a "Monitor Active" message to the worker check-in device 104 and initiate an Active Monitoring Session if the worker is successfully logged in. If the worker is not logged in, then the FSS may reject the monitoring session by sending may a "Monitor Fail—No Driver" message to the worker check-in device 104, buzzer 222 may emit a Login Reminder Tone, and method 300 may return to 302 and the worker may be required to login. The confirmation/rejection may be performed automatically by FSS software, or may require approval from an administrator.

If worker check-in device 104 receives a "Monitor Active" signal, then monitor requested LED 208 may be turned off, monitor active LED 210 may be turned on, and a CHECKIN TIMER may be started, and method 300 proceeds to 310. "Monitor Active" indicates that the request for monitoring was successful and the FSS will begin monitoring the worker by requiring period check-ins.

If a "Monitor Fail—No Driver" signal is received from the FSS, monitor requested LED 208 may be turned off. The worker may be able to request another Active Monitoring Session at any time.

Check-In Based Monitoring

During an Active Monitoring Session at step 310, worker check-in device 104 waits for switch 206 to be pressed and initiates corresponding actions with each press. The worker may be prompted to check-in by flashing LEDs, and a worker checks in by pressing switch 206.

Figure 4:
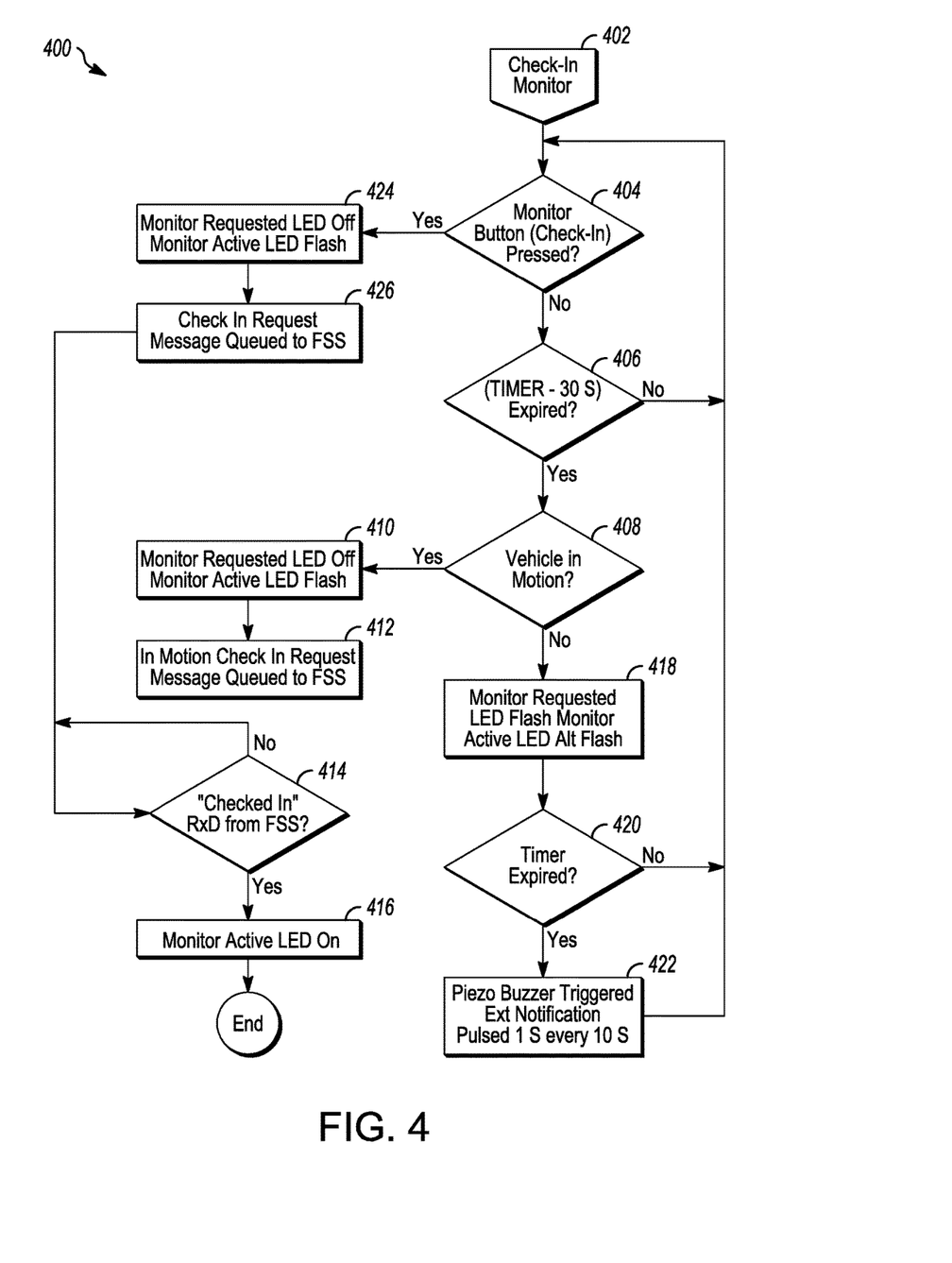
FIG. 4 displays a flowchart for an Active Monitoring Session according to a non-limiting embodiment of the present invention.

FIG. 4 displays a flowchart of a method 400 for an Active Monitoring Session of step 310. During an Active Monitoring Session, the worker periodically checks-in by pressing switch 206 (404) and the worker check-in device 104 initiates prompts via flashing LEDs and performs actions whenever the switch 206 is pressed.

There may be Monitor Active 1, 2, & 3 messages defined to adjust Check-In Interval. For example Active 1 initiates a 2 minute check-in, Active 2 initiates a 5 minute check-in, and Active 3 initiates a 10 minute check-in. While a vehicle is in motion, the system may assume that the worker is OK and may check-in with a unique CHECK-IN type on behalf of the driver. It may be entirely dependent on the vehicle being in communications coverage to successfully check the worker in. The "in motion" state may be likely to experience periodic coverage gaps.

Whenever switch 206 is pressed, (i.e. worker has just checked in) monitor requested LED 208 may be turned off, monitor active LED 210 may flash, and a CHECKIN REQUEST signal may be sent to worker monitoring server 108 and queued in the FSS (424). Worker check-in device 104 may then wait to receive a "Checked In" message from the FSS (414). Once the message is received, monitor active LED 210 may be turned on (416), which may alert the worker that his or her check-in was received on the FSS, and CHECKIN TIMER may be reset or re-started. Monitor requested led 208 may be turned off and monitor active led 210 may be turned on. FSS may acknowledge the check-in automatically or via an operator.

If a worker presses and holds switch 206 for a predefined time, for example 10 seconds, then the Active Monitoring Session may be disabled or terminated, as described herein.

Whenever switch 206 is not pressed at 404, worker check-in device 104 may start running an internal timer (e.g. CHECKIN TIMER) to count down to the next required check-in (406). The timer may be a predefined time, for example five minutes. The timer may continuously increase or decrease (depending on whether it is counting up or counting down), and once the time reaches a first time limit, for example four minutes and thirty seconds, worker check-in device 104 may determine whether vehicle 102 is in motion by communicating with one or more vehicle systems (408).

If vehicle 102 is in motion, then monitor requested LED 208 may be turned off, monitor active LED 210 may flash (410), and an IN MOTION CHECKIN REQUEST signal may be sent to worker monitoring server 108 and queued in the FSS (412). From here, worker check-in device 104 may then wait to receive a "Checked In" message from the FSS as described herein above.

While vehicle 102 is in motion it is likely the worker is driving and may be unable to check-in, and the worker may not require monitoring. Worker check-in device 104 may continue monitoring the motion of the vehicle. Worker check-in device 104 may be capable of tracking movements of vehicle 102, including multiple starts and stops. Worker check-in device 108 may continue one single Active Monitoring Session while a vehicle 102 starts and stops, for example vehicle 102 is stopped a first time and an Active Monitoring Session is initiated, then the vehicle 102 moves and then comes to a second stop. If the movement of the vehicle was less than a predefined time (such that the time between the vehicle being stopped does not exceed a threshold), then the Active Monitoring Session during the first stop may enter a waiting phase to continue monitoring during the next stop. If the time the vehicle moves exceeds the predefined time/threshold, then a second Active Monitoring Session may need to be initiated at the second stop (this may have the related benefit that if the second stop is at a location without network coverage then the system and worker may become alert to this lack of coverage due to the forced check in).

If vehicle 102 is not in motion at 408, then monitor requested LED 208 may flash, and monitor active LED 210 may flash (418), indicating to the worker a check-in is required.

If the worker fails to check-in (via pressing switch 206) and the timer reaches a second time limit, for example five minutes (420), buzzer 220 or speaker 212 may emit an audible notification to let the worker know a check-in is required, and monitor requested LED 208 and/or monitor active LED 210 may enter a pulsing state, for example illuminated for one second and then not illuminated for nine seconds (422).

If vehicle 102 is not in motion and the timer has reached the second time limit, a supervisor may be alerted that a worker in an Active Monitoring Session has not checked in. The supervisor may be alerted automatically by the FSS software or by an administrator. The supervisor may then take further actions to check on the worker.

Terminating an Active Monitoring Session

Figure 5:
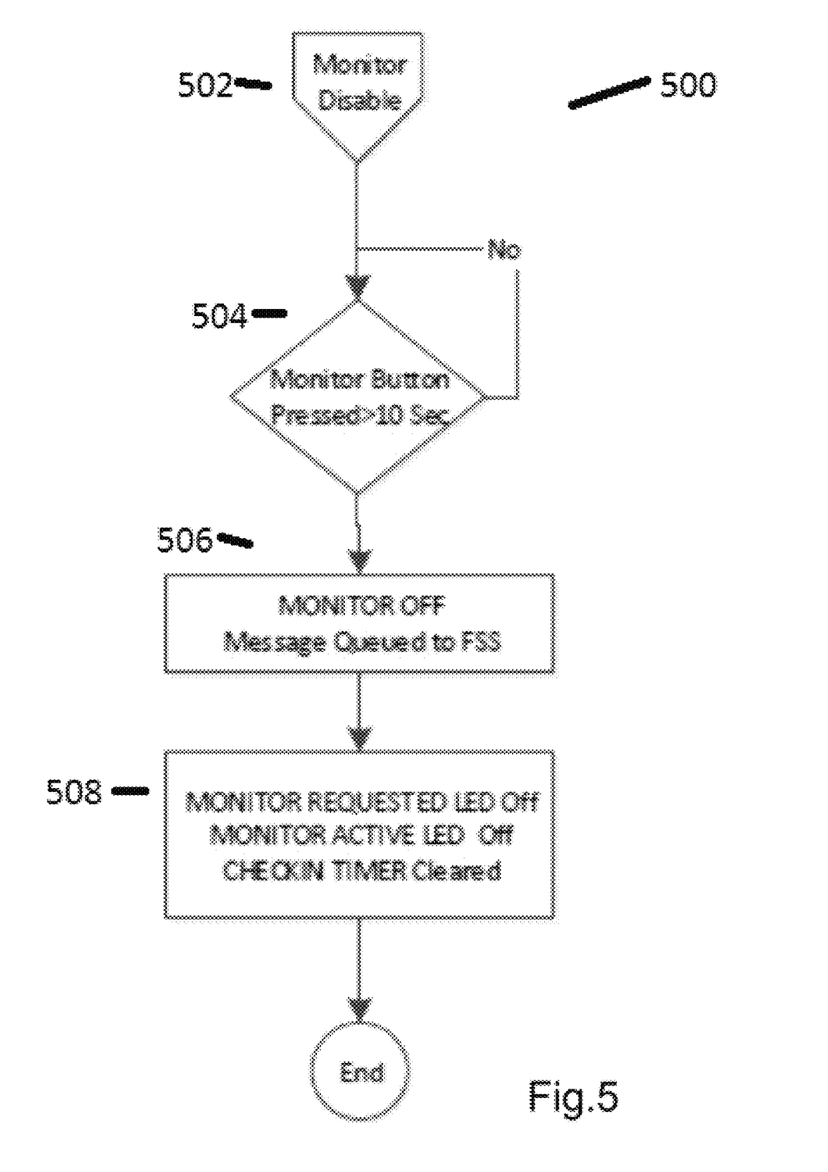
FIG. 5 displays a flowchart for terminating an Active Monitoring Session according to a non-limiting embodiment of the present invention.

FIG. 5 displays a flowchart for method 500 for terminating an Active Monitoring Session of step 312. A worker may end an Active Monitoring Session by pressing and holding switch 206 for a predefined time, for example ten seconds (504). Of course it is to be understood that this may also occur in method 400, such as at 404 if the button is held for a period of time. After switch 206 is held for the predefined time, a MONITOR OFF signal may be sent to the worker monitoring server 108 and queued in the FSS (506), monitor requested LED 208 may be turned off, monitor active LED 210 may be turned off, and CHECKIN TIMER may be cleared/zeroed (508). The MONITOR OFF signal sent to the FSS may alert the FSS that the worker no longer wishes to be monitored. Method 500 may then end.

It will be apparent to one of skill in the art that other configurations, hardware etc. may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

The aforementioned embodiments have been described by way of example only. The invention is not to be considered limiting by these examples and is defined by the claims that now follow.

What is claimed is:

1. A system for monitoring a vehicle in a fleet of vehicles and a worker that is driving the vehicle, the system comprising:
   a headless vehicle monitoring device, mounted in the vehicle, comprising:
   a headless check-in switch and a headless check-in indicator;
   a communication module configured to communicate with a worker monitoring server;
   a processor, executing computer-readable instructions stored on a non-transitory medium, configured to:
   obtain a computer readable start monitoring signal from the headless check-in switch to launch a monitoring session;
   communicate the computer readable start monitoring signal to the worker monitoring server;
   prompt, via the headless check-in indicator, a worker to check-in;
   receive, via the headless check-in switch, a computer readable check-in signal;
   send the computer readable check-in signal to the worker monitoring server; and
   confirm, via the headless check-in indicator, a check-in status received from the worker monitoring server.

2. The system of claim 1 further comprising a headless login device and a headless login status indicator and wherein the processor, is further configured to:
   receive, via the headless login device, a computer readable login signal;
   provide the computer readable login signal to the worker monitoring server;
   indicate, via the headless login status indicator, a login status received from the worker monitoring server.

3. The system of claim 2 further comprising a vehicle OBDII interface, configured to communicate with a vehicle OBDII computer and wherein the processor is further configured to:
   accumulate performance data from a vehicle OBDII interface; and
   send the performance data to the worker monitoring server for performance monitoring.

4. The system of claim 3 wherein the performance data comprises driver performance data when the login status indicates the worker is logged in.

5. The system of claim 3 wherein the communication module is configured to communicate with a geo-location service and the performance data further comprises geo-location data.

6. The system of claim 3 wherein the performance data further comprises an ignition status and the processor is further configured to request, via the headless login status indicator, a computer readable login signal based on the ignition status.

7. The system of claim 6 wherein the processor is further configured to log off the worker, and terminate the monitoring session, based on the ignition status.

8. The system of claim 2 wherein the indicating comprises an audible tone when the login status is unsuccessful.

9. The system of claim 2 wherein the receiving further comprises the headless login device scanning an identification device.

10. The system of claim 2 wherein the headless monitoring switch comprises one or more light emitting diodes that can be lit, unlit or flashing, indicating the check-in status and the headless login status indicator comprises one or more light emitting diodes that can be lit, unlit or flashing, indicating the login status.

11. A method for monitoring a vehicle in a fleet of vehicles and a worker that is driving the vehicle, the method comprising:
   obtaining, by a headless vehicle monitoring device, mounted in the vehicle, a computer readable start monitoring signal from the headless check-in switch to launch a monitoring session;
   communicating the computer readable start monitoring signal to a worker monitoring server;
   prompting, via a headless check-in indicator, a worker to check-in;
   receiving, via a headless check-in switch, a computer readable check-in signal;
   sending the computer readable check-in signal to the worker monitoring server; and
   confirming, via the headless check-in indicator, a check-in status received from the worker monitoring server.

12. The method of claim 11 further comprising:
   receiving, via a headless login device, a computer readable login signal;
   providing the computer readable login signal to the worker monitoring server;
   indicating, via a headless login status indicator, a login status received from the worker monitoring server.

13. The method of claim 12 further comprising:
   accumulating performance data of the vehicle from a vehicle OBDII interface configured to communicate with a vehicle OBDII; and sending the performance data to the worker monitoring server for performance monitoring.

14. The method of claim 13 wherein the performance data further comprises driver performance data when the login status indicates the worker is logged in.

15. The method of claim 13 wherein the performance data further comprises geo-location data from a geo-location service.

16. The method of claim 13 wherein the performance data further comprises an ignition status, the method further comprising requesting, via the headless login status indicator, a computer readable login signal based on the ignition status.

17. The method of claim 16 further comprising logging off the worker, and terminating the monitoring session, based on the ignition status.

18. The method of claim 12 wherein the indicating comprises an audible tone when the login status is unsuccessful.

19. The method of claim 12 wherein the receiving further comprises the headless login device scanning an identification device.

20. The method of claim 12 wherein the headless monitoring switch comprises one or more light emitting diodes that can be lit, unlit or flashing, indicating the check-in status and the headless login status indicator comprises one or more light emitting diodes that can be lit, unlit or flashing, indicating the login status.

* * * * *